Patented Nov. 17, 1931

1,832,233

UNITED STATES PATENT OFFICE

FRIEDRICH MUTH, OF ELBERFELD, GERMANY, ASSIGNOR TO GENERAL ANILINE WORKS, INC., OF NEW YORK, N. Y., A CORPORATION OF DELAWARE

SULPHUR DYESTUFFS

No Drawing. Application filed August 30, 1928, Serial No. 303,111, and in Germany September 15, 1927.

The present invention relates to sulphur dyestuffs dyeing violet to green shades which dyes are obtainable by reacting with sulphur upon a compound of the probable general formula

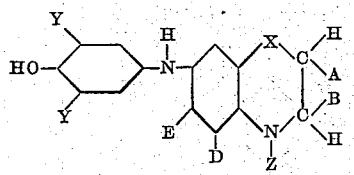

wherein A and B signify hydrogen, alkyl, aralkyl or aryl or stand jointly for one of the groupings

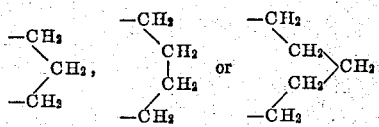

Z represents hydrogen, alkyl, aralkyl or aryl, D and E stand for hydrogen or jointly for one of the groupings

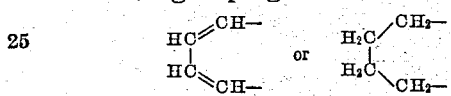

X means $CH_2$ or

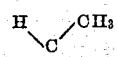

and Y stands for hydrogen or chlorine.

The starting materials, having in their leuco form the above given probable general formula, are obtainable by causing a compound of the general formula

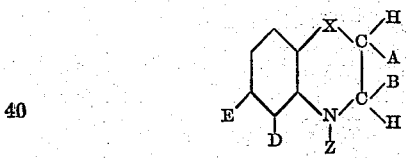

wherein A, B, Z, D, E and X have the above mentioned signification, to be reacted upon by p-aminophenols, quinone-halogenimides or p-nitrosophenols according to the conditions usually employed for the production of indophenols from indoles. The indophenolic compounds thus obtainable form deep red to blue colored alkaline solutions, which are easily reduced to the corresponding leuco-indophenols, which latter are yellowish to brownish colored crystalline substances, easily soluble in water, alcohol and sulphuric acid. The alkaline solutions of the leuco indophenols are easily re-oxidized, for instance by action of atmospheric oxygen to the corresponding indophenols.

Now I have found that by submitting these novel indophenolic compounds or their leuco derivatives to a sulphur fusion novel sulphur colors are produced. The products obtained in both cases are substantially identical; when using the indophenolic compounds these are presumably primarily reduced to the leuco indophenolic compounds in the sulphur melt. I wish it therefore to be understood that the term indophenolic compound is used herein as generic for both the indophenolic compounds and their leuco derivatives.

The conditions of the sulphur fusion can be varied within wide limits without departing from the spirit of my invention. I prefer, however, to use an alcoholic polysulphide fusion.

My novel sulphur dyestuffs are in the dry state dark violet to black powders, they are soluble in sodium sulphide solutions, from which cotton is dyed violet to green shades exceedingly fast to light and boiling. They can also be reduced to form hydrosulphite vats, from which cotton is dyed similar shades.

The following examples will illustrate my invention without limiting it thereto:—

*Example 1.*—294 parts by weight of the leuco indophenol from octo-hydro-γ-naphthoquinoline and para aminophenol, of the formula

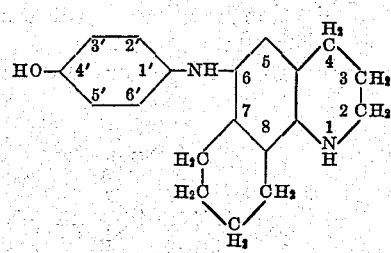

are boiled for about 70 hours under a reflux condenser with 690 parts by weight of calcined sodium sulphide and 830 parts by weight of sulphur with 1200 parts by weight of alcohol with the addition of 50 parts by weight of copper sulphate. The alcohol is then distilled off after water has been added to the reaction mixture and the dyestuff which separates is filtered off. The residue is treated with suitable organic solvents capable of dissolving sulphur or it is cleared from sulphur by means of the exactly calculated quantity of sodium sulphide; the dyestuff is then washed and dried.

The dyestuff appears as a dark powder and dyes cotton from a sodium sulphide or hydrosulphite vat powerful yellowish green shades. The fastness to light and boiling is satisfactory.

*Example 2.*—293 parts by weight of the leuco indophenol from octo-hydro-acridine and para-aminophenol, of the formula:

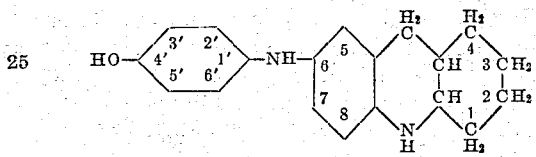

(6-octohydro-acridyl)-(4'-hydroxyphenyl)-amine, are melted under the same conditions as described in Example 1. The dyestuff is obtained as a black powder and dyes cotton from a sodium sulphide bath powerful deep green shades.

The fastness properties of the dyestuff thus obtained are similar to those of the dyestuff of Example 1.

Dyestuffs similar to those described in the examples will be formed when starting from other compounds than those especially mentioned in the examples which fall within the scope of the probable general formula:

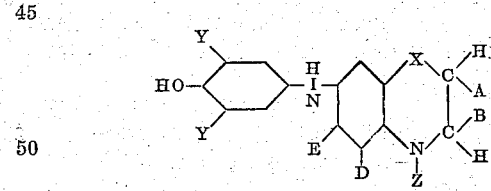

wherein A, B, Z, D, E, X and Y have the same signification as given in the definition of the first formula.

As compounds of the general formula:

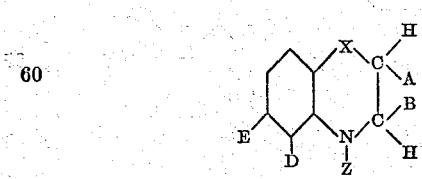

may be mentioned by way of example:

| Name | Formula | The complete dyestuffs, formed of these compounds, yielding the following shades |
|---|---|---|
| Tetrahydro-quinoline | 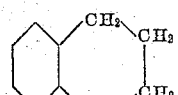 | blue to blackblue |
| Tetrahydro-quinaldine | 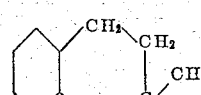 | blue to blackblue |
| Tetrahydro-lepidine | 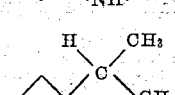 | blue to blackblue |
| Tetrahydro-α-naphthoquinoline (preferably copper and its salts—sulphate, sulphide.) | 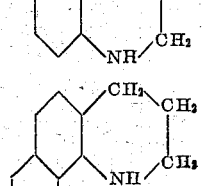 | bluish green |

I claim:—

1. Sulphur dyestuffs which in the dry state form violet to black powders, dyeing cotton from a sodium sulphide bath violet to green shades particularly fast to light and boiling, which are substantially identical with the products obtainable by submitting to a polysulphide fusion a compound having in its leuco form the probable general formula:

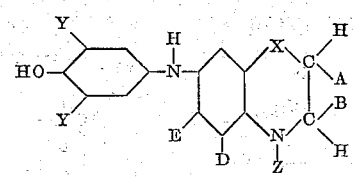

wherein A and B signify hydrogen, alkyl, aralkyl or aryl or stand jointly for one of the groupings

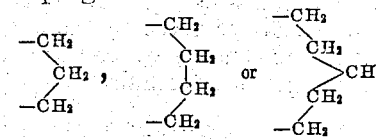

Z represents hydrogen, alkyl, aralkyl or aryl, D and E stand for hydrogen or jointly for one of the groupings

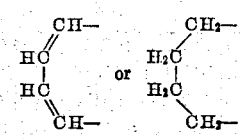

X means CH$_2$ or

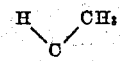

and Y stands for hydrogen or chlorine.

2. Sulphur dyestuffs which in the dry state form violet to black powders, dyeing cotton from a sodium sulphide bath violet green shades particularly fast to light and boiling, which are substantially identical with the products obtainable by submitting to a polysulphide fusion a compound having in its leuco form the probable general formula:

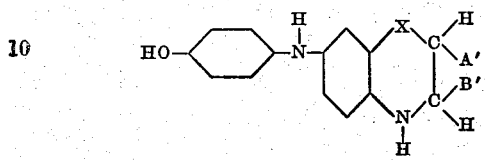

wherein A' and B' signify hydrogen, alkyl or stand jointly for the grouping

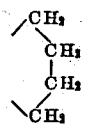

and X means $CH_2$ or

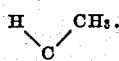

3. A new sulphur dyestuff which in the dry state forms a black powder dyeing cotton from a sodium sulphide bath powerful deep green shades particularly fast to light and boiling, which is substantially identical with the product obtainable by submitting to a polysulphide fusion the compound of the probable formula:

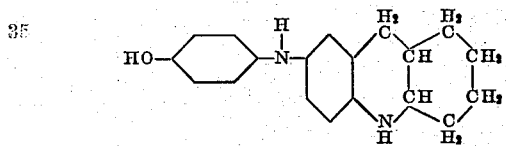

4. A new sulphur dyestuff which in the dry state forms a dark powder dyeing cotton from a sodium sulphide bath yellowish green shades particularly fast to light and boiling, which is substantially identical with the product obtainable by submitting to a polysulphide fusion the compound of the probable formula:

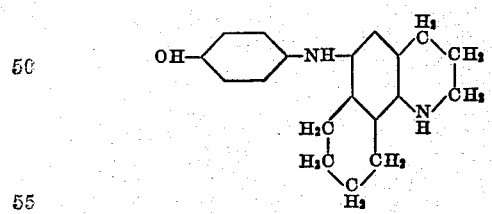

In testimony whereof I have hereunto set my hand.

FRIEDRICH MUTH. [L. S.]